United States Patent Office 3,354,238
Patented Nov. 21, 1967

3,354,238
BLENDS OF METHYL METHACRYLATE RESINOUS COPOLYMERS AND GRAFTED ELASTOMERS
Joseph Michael Schmitt, Ridgefield, Leo Augustine Landers, Stamford, and Joseph Francis Terenzi, Ridgefield, Conn., assignors to American Cyanamid Company, Stamford, Conn., a corporation of Maine
No Drawing. Filed Dec. 20, 1966, Ser. No. 603,167
8 Claims. (Cl. 260—876)

ABSTRACT OF THE DISCLOSURE

A molding composition of improved clarity, heat distortion temperature, impact strength, color and gloss is prepared by blending (A) 70%–95% of a resinous terpolymer of 67–72 parts methyl methacrylate, 18–22 parts styrene and 8–12 parts acrylonitrile and (B) 5%–30% of polybutadiene grafted with 67–80 parts methyl methacrylate, 17–21 parts styrene and 1–13 parts acrylonitrile, the ratio of polybutadiene to monomer in (B) ranging from 2:1 to 3:1, respectively.

---

This invention is a continuation-in-part of U.S. patent application Ser. No. 470,583 filed July 8, 1965, and now abandoned, which, in turn, is a continuation-in-part of U.S. patent application Ser. No. 195,434 filed May 17, 1962, and now abandoned.

This invention relates to improved thermoplastic compositions characterized by their clarity (light transmission), heat distortion temperature, impact strength, color and gloss. More particularly, this invention relates to novel thermoplastic molding compositions characterized by their exceptionally high impact strength, and heat distortion temperature, their color, their clarity, and their high gloss and transparency. Still more particularly, this invention relates to novel thermoplastic molding compositions formed from grafted polybutadiene blended with a resinous polymer composed of methyl methacrylate, styrene and acrylonitrile.

It is well known in the art to prepare thermoplastic compositions utilizing blends of various polymers and rubber latices. Compositions of this type have been prepared by various methods. In addition, copolymers of methacrylic acid esters have been blended with butadiene-styrene and polybutadiene latices by various and sundry methods. Although the compositions shown in the prior art possess high impact strengths, or clarity etc., they do not possess the unique combination of properties of the instant compositions. That is to say, while prior art compositions individually may possess one or two of the properties mentioned above, the compositions fail to exhibit the other expressed properties and therefore are not suited for the uses for which the instant compositions have been found applicable.

It is therefore an object of the present invention to prepare improved thermoplastic compositions characterized by their clarity (light transmission), impact strength, heat distortion temperature, color, and gloss.

It is a further object of this invention to provide novel thermoplastic molding compositions formed from blends of (1) a resinous polymer composed of methyl methacrylate, styrene and acrylonitrile and (2) polybutadiene grafted with said monomers.

These and other objects will become more apparent to those skilled in the art upon reading the more detailed description set forth hereinbelow.

We have found that our thermoplastic molding compositions can be prepared by blending a hard, resinous polymer of methyl methacrylate, styrene and acrylonitrile with polybutadiene which has been grafted with said monomers, the concentrations thereof in each component being well defined. The thermoplastic molding compositions have exceptional properties, especially in regard to their impact strength, color, clarity, heat distortion temperature and gloss. We have found that our compositions have a high impact strength, increased toughness, durable hardness, excellent chemical resistance, exceptional gloss, a high heat distortion temperature, glass like clarity and low color, a combination not possessed by analogous commercially available molding compositions.

Our compositions are produced by blending a polymer, produced by any known procedure, such as by the polymerization of methyl methacrylate, styrene and acrylonitrile in the presence of a free radical-generating catalyst, e.g. benzoyl peroxide and a polymerization regulator, at a temperature of from about 10° C. to 120° C. Generally the water-soluble, as well as the monomer-soluble, types of catalysts may be employed in amounts ranging from about 0.05 to 5.0 parts, by weight, of the monomers employed.

Emulsion polymerization processes may also be employed, and any available emulsifier may be used, with compounds such asf atty acid soaps, rosin soaps, sodium lauryl sulfate, non-ionic emulsifiers such as polyethoxy alkylated phenols, compounds such as dioctyl sodium sulfosuccinate and the like, in amounts ranging from about 1% to 8%, by weight, preferably 4% to 5%, by weight, based on the amount of monomers employed, being exemplary.

Polymerization regulators may be used, with compounds such as the organic sulfur compounds, i.e. the thio acids, mercaptans such as benzyl mercaptan, aliphatic mercaptans possessing at least 6 carbon atoms such as octyl, dodecyl and tertiary dodecyl mercaptan, mixtures of mercaptans such as are obtained from lauryl alcohol, nitrohydrazine, amino compounds, carbon tetrachloride and any other well known polymerization modifier or regulator, being exemplary. It is preferred however, to use the alkyl mercaptans of low water solubility, such as dodecyl mercaptan, in amounts ranging from about 0.01% to 5.0%, by weight, based on the weight of the monomers employed.

The terpolymer must contain from 67–72 parts of methyl methacrylate, 18–22 parts of styrene and 8–12 parts of acrylonitrile to achieve the properties mentioned above in the final composition when blended with the grafted rubber.

There may also be added to the terpolymer, after or during formation, such ingredients as light stabilizers, heat stabilizers, antioxidants, lubricants, plasticizers, pigments, fillers, dyes and the like, without detracting from the unique properties of our novel molding compositions.

The grafted polybutadiene employed as component (2) in our novel molding compositions is likewise prepared by any known process.

The polybutadiene must be grafted, with from about 67–80 parts of methyl methacrylate, 17–21 parts of styrene and 1–13 parts of acrylonitrile to produce, when blended with the polymer, compositions having the above-mentioned unique combination of properties.

The polybutadiene to monomers ratio must range from about 2/1–3/1, respectively, and the polybutadiene must be present in the final composition in an amount ranging from about 5–30%.

The terpolymer and the grafted polybutadiene may be blended together to form our novel molding compositions, in any known manner, such as for example, utilizing a ball mill, hot rolls, emulsion blending and the like.

It is preferred, however, that the blending operationn be carried out by preparing a stream of each of the components iin a form enabling accurate metering of these components, i.e. a polymer solution and a rubbery latex, in proportions to produce the desired composition, to a devolatilizer-extruder where the two streams are mixed, compounded, devolatilized and extruded in a very short period of time. In the devolatilizer-extruder the mixture is worked in a chamber under heat and vacuum so that new surfaces of the polymer mixture are continuously and rapidly exposed to vacuum to remove the monomeric solvent (and water where rubber in latex form is used) before extruding the product. The term "devolatilization" as herein employed refers to the step in which the nonpolymeric material is removed from the mixture of resin solution and rubbery latex or dispersion. The apparatus which simultaneously devolatilizes and extrudes the material is of a commercially available design and comprises a chamber with one or more screws havinng a close tolerance with the wall for compounding the material in its passage therethrough, and at least one vacuum chamber for removing the volatile components of the feed. The action of working the material under the close tolerance of the screws not only intimately blends the mixture, but generates substantial heat which aids in the devolatilizing of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or nonvolatile modifiers, plasticizers or colorants, may be incorporated into the composition and extruded therewith.

The vacuum sections of the devolatilizer extruder are heated to temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the two streams are introduced into the devolatilizer-extruder, the increased temperature causes volatilization of the nonpolymer therefrom. At the same time, because the extruder is maintained at subatmospheric pressures, the volatile material is withdrawn or volatilized from the polymer-containing material. It should be noted that the present process does not concern the polymerization of the two components of our novel composition in the blending step, but the blending in the devolatilizer-extruder rather concerns the blending in combination with the removal of the volatile ingredients from the two components. In fact, the rapid passage of the components through the devolatilizer-extruder is not conductive to any significant polymerization because of the rapidity of the step.

As mentioned above, the stream of each component charged to the devolatilizer-extruder may be in the form of a dispersion, a solution, an emulsion or a latex with any known solvent for the polymer and the grafted rubber being employed. Such compounds as benzene, toluene, xylene, aliphatic esters, naphthalene, tetralene, trichlorobenzene, dimethylformamide and the like are exemplary and, as such, may be used in our process.

Alternatively, one of the monomeric compounds from which the major proportion of terpolymer is derived may be employed as the solvent for both the terpolymer and the grafted polybutadiene when the rubber is blended in solution rather thann as a latex.

In the devolatilizer-extruder, the volatile ingredients of the components are thoroughly removed as the mixture is worked, by the heat generated by the mechanical action of the devolatilizer screw under vacuum. By this technique, the rate of diffusion is so improved that substantially 100% of the undesirable volatiles are removed, thereby producing a molding composition having high impact strength and practically, free of all contaminants.

Our novel molding compositions have a heat distortion temperature under load (264 p.s.i.) above 75° C., a light transmission value of at least 85%, a yellowness index of 20% and below, an Izod impact strength of at least 0.5 f.p.p.i. at 5% polybutadiene and at least 2.8 f.p.p.i. at 20% polybutadiene and a high gloss.

The light transmission, yellowness index and gloss values are those as measured through a solid, molded sheet of molding composition having a thickness of ⅛ inch.

These properties enable the compositions to be formed into articles of manufacture never before thought possible. For example, our compositions may be formed into blow molded, compression molded, vacuum formed, etc. articles useful for the storage or transportation of many commercial, industrial and household products.

The following examples are set forth for purposes of illustration only and should not be construed as limitations on the present invention except as set forth in the appended claims. All parts and percentages are by weight unless otherwise indicated.

*Example 1*

7 parts of polybutadiene rubber, in the form of a rubber latex at 50% solids, which is comprised of 5 parts of rubber and 2 parts of graft polymerized methyl methacrylate, styrene and acrylonitrile in a ratio of 78/19/3, respectively, are blended on a 2-roll mill with 93 parts of a terpolymer of 71/19/10 methyl methacrylate/styrene/acrylonitrile. The properties of a sheet produced from the resulting composition are as follows: Izod impact strength (notched)—0.5 f.p.p.i.; heat distortion temperature under load (264 p.s.i.)—76° C.; light transmission—85%; yellowness index—20%. (The light transmission, yellowness index and gloss are measured through a ⅛" thick molded specimen; Gloss—84%. (The gloss values are obtained by measuring the reflected light at the same angle (60°) as the incident light).

*Example 2*

The procedure of Example 1 is again followed except that 14 parts of the grafted polybutadiene are blended with 86 parts of the terpolymer. The resultant properties are as follows: Izod impact strength (notched)—1.0 f.p.p.i.; heat distortion temperature under load (264 p.s.i.)—75° C.; light transmission—85%; yellowness index—20%; Gloss—80%.

*Example 3*

Again following the procedure of Example 1, 21 parts of grafted polybutadiene are blended with 79 parts of terpolymer. The properties of the resultant molded articles are as follows: Izod impact strength (notched)—2.0 f.p.p.i.; heat distortion temperature under load (264 p.s.i.—75° C.; light transmission—85%; yellowness index—18%; Gloss—75%.

*Example 4*

Again following the procedure of Example 1, 28 parts of grafted rubber are blended with 72 parts of terpolymer, the resultant product has the following properties; Izod impact strength (notched)—2.8 f.p.p.i.; heat distortion temperature under load (264 p.s.i.)—75° C.; light transmission—85%; yellowness index—16%; Gloss—70%.

Following the procedure of Example 1, the concentrations of methyl methacrylate, styrene and acrylonitrile, both in the terpolymer and the grafted rubber, were varied. Additionally, a butadiene/styrene rubber (71/29) was substituted for the polybutadiene of the instant invention. The results of these variations are presented in Table I below.

acrylate, 19 parts of styrene and 3 parts of acrylonitrile.

3. A composition according to claim 1 wherein the polybutadiene to rubber ratio is 2.5 to 1, respectively.
4. A composition according to claim 1 containing 95% of (A) and 5% of (B).
5. A composition according to claim 1 containing 90% of (A) and 10% of (B).

TABLE I

| Example | Terpolymer, parts | | | Grafted polybutadiene, parts | | | Percent rubber | PB/M ratio | Heat distortion temperature (264 p.s.i.), °C. | Yellowness Index, Percent | Light transmission, Percent | Izod impact strength (notched), f.p.p.i. | Gloss, Percent |
|---|---|---|---|---|---|---|---|---|---|---|---|---|---|
| | MMA | ST | AN | MMA | ST | AN | | | | | | | |
| 5 | 72 | 18 | 10 | 80 | 17 | 3 | 5 | 2.5/1 | 79 | 18 | 85 | 0.6 | 82 |
| 6 | 67 | 22 | 11 | 76 | 20 | 4 | 20 | 2/1 | 77 | 20 | 85 | 3.0 | 71 |
| 7 | 72 | 20 | 8 | 78 | 21 | 1 | 20 | 3/1 | 76 | 20 | 87 | 2.9 | 72 |
| 8 comp | 76 | 18 | 6 | 80 | 17 | 3 | 20 | 2.5/1 | 75 | 20 | 70 | 2.4 | 70 |
| 9 comp | 60 | 26 | 14 | 72 | 21 | 7 | 20 | 2.5/1 | 75 | 24 | 72 | 2.6 | 71 |
| 10 comp | 67 | 25 | 8 | 74 | 25 | 1 | 20 | 2.5/1 | 76 | 18 | 78 | 2.3 | 74 |
| 11 comp | 72 | 15 | 13 | 80 | 13 | 7 | 20 | 2.5/1 | 76 | 22 | 75 | 2.4 | 73 |
| 12 comp | 67 | 18 | 15 | 76 | 15 | 9 | 20 | 2.5/1 | 75 | 25 | 82 | 2.5 | 71 |
| 13 comp | 72 | 24 | 4 | 80 | 20 | 0 | 20 | 2.5/1 | 72 | 20 | 76 | 1.1 | 70 |
| | | | | Grafted butadiene/styrene (71/29) | | | | | | | | | |
| 14 comp | 46 | 44 | 10 | 48 | 47 | 5 | 20 | 2.5/1 | 75 | 20 | 70 | 2.4 | 69 |
| 15 comp | 71 | 19 | 10 | 78 | 19 | 3 | 5 | 2.5/1 | 76 | 20 | (¹) | 0.3 | 79 |
| 16 | 69 | 20 | 11 | ²69 | ²20 | ²11 | 5 | 2.5/1 | 80 | 20 | 85 | 0.7 | 89 |
| 17 | 69 | 20 | 11 | ²69 | ²20 | ²11 | 15 | 2.5/1 | 79 | 20 | 85 | 2.2 | 84 |
| 18 | 69 | 20 | 11 | ²69 | ²20 | ²11 | 10 | 2.5/1 | 80 | 20 | 85 | 1.3 | 87 |
| 19 | 69 | 20 | 11 | ²69 | ²20 | ²11 | 20 | 2.5/1 | 77 | 20 | 85 | 3.1 | 77 |

¹ Opaque.
² Grafted polybutadiene used.
CODE.—MMA=methyl methacrylate; ST=styrene; AN=acrylonitrile; PB=polybutadiene; M=monomers; comp=comparative.

We claim:
1. A molding composition characterized by a heat distortion temperature under load (264 p.s.i.) above about 75° C., a light transmission of at least about 85%, a yellowness index of 20% and below, an Izod impact strength of at least about 0.5 f.p.p.i. at 5% rubber and at least about 2.8 f.p.p.i. at 20% rubber and a high gloss comprising a physical blend of (A) 70%–95% of a hard, resinous terpolymer comprising from about 67–72 parts of methyl methacrylate, 18–22 parts of styrene and 8–12 parts of acrylonitrile and (B) 5%–30% of polybutadiene grafted with from about 67–80 parts of methyl methacrylate, 17–21 parts of styrene and 1–13 parts of acrylonitrile, the ratio of polybutadiene to monomer in (B) ranging from about 2:1 to 3:1, respectively.
2. A composition according to claim 1 wherein (A) is a terpolymer of 71 parts of methyl methacrylate, 19 parts of styrene and 10 parts of acrylonitrile and (B) is polybutadiene grafted with 78 parts of methyl methacrylate, 19 parts of styrene and 3 parts of acrylonitrile.

6. A composition according to claim 1 containing 80% of (A) and 20% of (B).
7. A composition according to claim 1 containing 75% of (A) and 25% of (B).
8. A composition according to claim 1 wherein (A) is a terpolymer of 69 parts of methyl methacrylate, 20 parts of styrene and 11 parts of acrylonitrile and (B) is polybutadiene grafted with 69 parts of methyl methacrylate, 20 parts of styrene and 11 parts of acrylonitrile.

References Cited
UNITED STATES PATENTS

| 3,260,772 | 7/1966 | Cummings | 260—876 |
| 3,261,887 | 7/1966 | Mann | 260—876 |
| 3,300,545 | 1/1967 | Baer | 260—876 |

FOREIGN PATENTS
845,638  8/1960  Great Britain.

GEORGE F. LESMES, *Primary Examiner.*